Nov. 16, 1965 I. V. GODIER 3,218,570

AUTOMATIC VARIABLE ATTENUATOR CIRCUIT

Filed Jan. 28, 1963

INVENTOR
IVAN GODIER

BY Smart & Biggar
ATTORNEYS.

United States Patent Office 3,218,570

Patented Nov. 16, 1965

3,218,570

AUTOMATIC VARIABLE ATTENUATOR CIRCUIT

Ivan Godier, Ottawa, Ontario, Canada, assignor to Northern Electric Company Limited, Montreal, Quebec, Canada Filed Jan. 28, 1963, Ser. No. 254,072
3 Claims. (Cl. 330—143)

Figure 1:
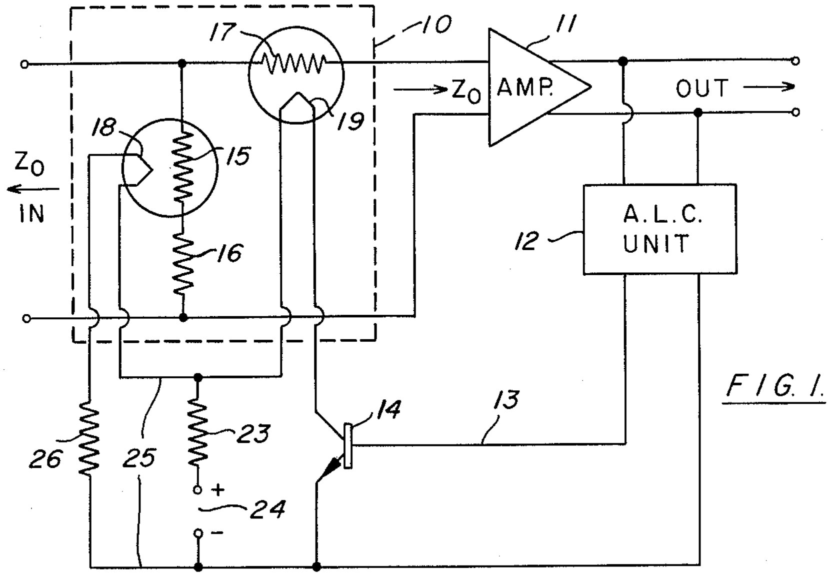

This invention relates to automatic level control systems and more specifically provides an improved variable attenuator for such a system.

Automatic level control systems employing thermistors as control elements are well known for reducing the undesirable variations in the output signal level of transmission systems. Such variations may be caused by changes in attenuation of the interconnecting cables associated with the system, with ambient temperature and/or variations in gain of the associated amplifiers.

These control systems are particularly useful in broadband amplifiers such as those used in video distribution systems with frequencies extending into the VHF region. When extremely low distortion is a prerequisite in a video distribution system, it is generally not possible to directly vary the gain of the active elements in the associated amplifiers. Any such attempt would derange the operating conditions of the amplifier and increase the distortion above a tolerable level.

In one such control system, a single thermistor is placed either in series or in shunt with the input to the system and the impedance of the thermistor is altered, in accordance with variations in the output signal level, by a control network in such a direction so as to reduce the undesirable output signal level variations. If, as stated above, only one thermistor is located at the system input, variations in the thermistor impedance also affect the system input impedance, and may, therefore, cause undesirable reflections if connected to the end of a long line transmission system. This can be overcome at additional cost by utilizing a buffer amplifier between the system input and the attenuator input. Besides the additional cost, the use of a buffer amplifier may unnecessarily introduce additional distortion into the system.

An alternate method of maintaining the system input impedance constant is to use a bridge-T network containing two thermistors. One of the two thermistors is used to control the attenuation of the network in response to variations in the output signal level, while the other thermistor is used to control the impedance of the network in response to an unbalance created in the normally balanced series arm of the bridge-T network. One disadvantage of this system is that a separate control circuit must be used for each thermistor; one across the system output and the other across the normally balanced series arm of the bridge-T network. Another disadvantage is the series impedance of the bridge-T network across which the unbalance is detected is ungrounded. In the VHF band, undesirable mismatches may be introduced by such a configuration.

The disadvantages of the present systems may be overcome according to the present invention by utilizing two thermistors to control both the attenuation and input impedance of the system through a single unit controlled by variations in the output signal level. Thus a sample of the output level is fed to an automatic level control unit which produces a D.C. error signal proportional to the output level. The error signal controls the power to a separate heater associated with each control thermistor in such a manner as to differentially vary the power to the two thermistor heaters. The impedance of the thermistors will then vary inversely with respect to each other.

If reciprocal relationship is maintained between the impedance of the two thermistors, the input impedance and, if desired, the output impedance of the attenuator network can be maintained constant.

Figure 2:
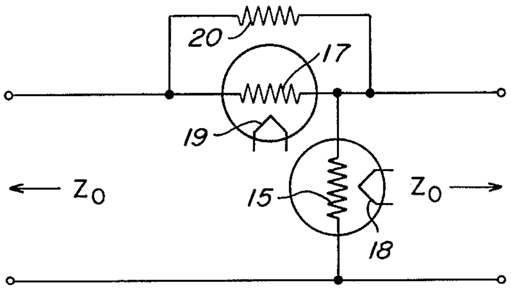
Figure 3:
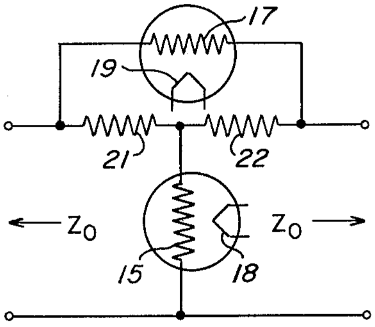

In the drawings which illustrate embodiments of the invention,

FIGURE 1 is a schematic circuit diagram of an automatic level control system having one form of a variable attenuator network according to the invention, and FIGURES 2 and 3 show modifications of the variable attenuator network of FIGURE 1.

In the circuit of FIGURE 1, the system input is connected directly to attenuator 10, the output of which is connected to amplifier 11. The output of the amplifier is connected to the output of the system. A sample voltage from the output is fed to the automatic level control unit 12. This unit develops a varying D.C. error voltage proportional to the output signal level and may be of conventional design. The error voltage is fed through connecting lead 13 to control transistor 14.

The attenuator 10 comprises a first thermistor 15 serially connected to a first predetermined fixed impedance 16 and in shunt across the input of the attenuator 10. A second thermistor 17 is serially connected between the input and the output of the attenuator 10. A first control heater 18 is associated with thermistor 15 and a second control heater 19 is associated with the second thermistor 17. The input impedance to the attenuator will be maintained constant and equal to the line impedance providing:

(1) The impedance of fixed impedance 16 is made equal to the line impedance $Z_0$.

(2) The impedance of the two thermistors 15 and 17 are reciprocally controlled and equal to the line impedance $Z_0$ when they are equal to each other.

Thus:

$$Z_0=\sqrt{Z_{T1}\cdot Z_{T2}}=Z_F$$

where $Z_0$ is the line impedance,
$Z_{T1}$ is the impedance of the first thermistor,
$Z_{T2}$ is the impedance of the second thermistor,
$Z_F$ is the impedance of the fixed impedance 16.

The power to the heaters of the thermistors 15 and 17 is supplied through a high resistance 23 from a D.C. source of power 24 providing a constant current source 25. The first control heater 18 and a fixed resistor 26 are serially connected across the constant current source 25. The second control heater 19 is serially connected to the control transistor 14, the combination being in shunt with the first control heater 18 and the fixed resistor 26, across the constant current source 25. Because two control heaters 18 and 19 are fed from a constant current source 25, the sum of the currents through the control heaters will always equal a constant.

For example:

$$I_{H1}+I_{H2}=K$$

where:

$I_{H1}$ is the current through the first control heater.
$I_{H2}$ is the current through the second control heater.
K is a constant.

Thus, if an error signal on connecting lead 13 shuts control transistor 14 off, all the current from the constant current source 25 will flow through the control heater 18. Conversely, if transistor 14 is conducting heavily the impedance of the transistor 14 is then relatively low compared to the fixed resistor 26, and virtually all the current from the constant current source 25 will flow through the control heater 19. Thus, the total current from the constant current source 25, splits in a differential manner between the two heater 18 and 19, in accordance with the amplitude of the error signal on the lead 13. Because the impedance of thermistors 15 and 17 vary in accordance with their temperatures, they will be forced to vary inversely with respect to each other, when the power to the control heaters 18 and 19 is varied differentially.

An alternate form of input attenuator 10 shown in FIGURE 2 comprises first thermistor 15 in shunt across the output of the attenuator, and second thermistor 17 in shunt with a second fixed impedance 20 serially connected between the attenuator input and output. The control heaters 18 and 19 associated with thermistors 15 and 17 respectively, are also shown. The thermistor requirements for a constant input impedance to the attenuator input are similar to those indicated above. The second fixed impedance 20 must also be made equal to the line impedance $Z_0$.

A third form of input attenuator 10 shown in FIGURE 3 comprises a bridge-T network containing a third and fourth fixed impedance series arms 21 and 22 respectively, located between the input and the output of the attenuator 10, a first thermistor 15 shunt arm, and a second thermistor 17 bridging arm. Control heaters 18 and 19 are again associated with thermistors 15 and 17 respectively. The advantage of the bridge-T configuration over the other two is that both the input and the output impedances of the attenuator are maintained constant providing the two fixed impedances 21 and 22 are made equal to the line impedance $Z_0$, the two thermistors 15 and 17 are varied reciprocally and are equal to each other when they are equal to the line impedance $Z_0$.

What I claim as my invention is:

1. An automatic variable attenuator circuit comprising input connections for connecting an input signal voltage thereto, output connections for connecting an output signal voltage therefrom; an amplifier having an input and an output, the amplifier output being connected to said output connections; a variable attenuator network connected between the input connections and the amplifier input, and including a first thermistor and a fixed impedance connected in series across said input connections and a second thermistor connected in series between the input connections and the amplifier input; a first heater in juxtaposition with the first thermistor; a second heater in juxtaposition with the second thermistor; means for generating a variable direct current error signal that is proportional to the output signal voltage level; a high impedance source of direct current power; a transistor having base, emitter and collector electrodes, the emitter and collector electrodes being connected in series with the second heater across the high impedance source, the base and emitter electrodes being connected to the means for generating a variable direct current error signal; and a fixed resistor connected in series with the first heater across the high impedance source.

2. An automatic variable attenuator circuit comprising input connections for connecting an input signal voltage thereto, output connections for connecting an output signal voltage therefrom; an amplifier having an input and an output, the amplifier output being connected to said output connections; a variable attenuator network having a first thermistor connected in shunt with the amplifier input, and a second thermistor and a fixed impedance connected in shunt with each other between the input connections and the amplifier input; a first heater in juxtaposition with the first thermistor; a second heated in juxtaposition with the second thermistor; means for generating a variable direct current error signal that is proportional to the output signal voltage level; a high impedance source of direct current power, a transistor having base, emitter and collector electrodes, the emitter and collector electrodes being connected in series with the second heater across the high impedance source, the base and emitter electrodes being connected to the means for generating a variable direct current error signal; and a fixed resistor connected in series with the first heater across the high impedance source.

3. An automatic variable attenuator circuit comprising input connections for connecting an input signal voltage thereto, output connections for connecting an output signal voltage therefrom; an amplifier having an input and an output, the amplifier output being connected to said output connections; a bridge-T network connected between the input connections and the amplifier input, and including two fixed impedance series arms, a shunt arm having a first thermistor, and a bridging arm having a second thermistor; a first heater in juxtaposition with the first thermistor; a second heater in juxtaposition with the second thermistor; means for generating a variable direct current error signal that is proportional to the output signal voltage level; a high impedance source of direct current power; a transistor having base, emitter and collector electrodes, the emitter and collector electrodes being connected in series with the second heater across the high impedance source, the base and emitter electrodes being connected to the means for generating a variable direct current error signal, and a fixed resistor connected in series with the first heater across the high impedance source.

References Cited by the Examiner

UNITED STATES PATENTS

| | | | |
|---|---|---|---|
| 2,182,329 | 12/1939 | Wheeler | 330—144 X |
| 2,250,581 | 7/1941 | Heinecke | 330—143 X |

FOREIGN PATENTS

| | | |
|---|---|---|
| 131,275 | 2/1949 | Australia. |
| 664,644 | 1/1952 | Great Britain. |

OTHER REFERENCES

Ryder: Networks, Lines and Fields, Prentice-Hall, Englewood Cliffs, N.J., 1955, 2nd edition, pages 267–8 relied on.

ROY LAKE, *Primary Examiner.*